United States Patent
Matsuda (10) Patent No.: US 8,059,934 B2
(45) Date of Patent: Nov. 15, 2011

(54) VIDEO RECORDER AND PRINTING SYSTEM INCLUDING VIDEO RECORDER

(75) Inventor: Masahiro Matsuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1084 days.

(21) Appl. No.: 11/861,342

(22) Filed: Sep. 26, 2007

(65) Prior Publication Data

US 2008/0260353 A1    Oct. 23, 2008

(30) Foreign Application Priority Data

Sep. 27, 2006  (JP) ................. 2006-262482

(51) Int. Cl.
  *H04N 9/80* (2006.01)
  *G06F 3/00* (2006.01)
  *G06F 13/00* (2006.01)
  *H04N 7/025* (2006.01)
(52) U.S. Cl. .......... 386/239; 386/240; 386/248; 725/38; 725/39; 725/57
(58) Field of Classification Search .............. 386/239, 386/240, 248; 725/38, 39, 57
  See application file for complete search history.

(56) References Cited

U.S. PATENT DOCUMENTS

2005/0265169 A1* 12/2005 Yoshimaru et al. ......... 369/47.12
2007/0016924 A1*  1/2007 Ishida et al. ................... 725/38

FOREIGN PATENT DOCUMENTS

| JP | 2003-30675 A | 1/2003 |
| JP | 2003-134447 A | 5/2003 |
| JP | 2003-316533 A | 11/2003 |
| JP | 2003-333568 A | 11/2003 |
| JP | 2005-191622 A | 7/2005 |

OTHER PUBLICATIONS

Japanese Office Action dated Nov. 30, 2010 with English translation (four (4) pages).

* cited by examiner

*Primary Examiner* — Thai Tran
*Assistant Examiner* — Daquan Zhao
(74) *Attorney, Agent, or Firm* — Crowell & Moring LLP (57) ABSTRACT

A video recorder connected to an external device such as a printer or a personal computer. The video recorder comprises a tuner for receiving a television program and program information corresponding to the television program, a recording medium for recording the television program and the program information received by the tuner, a remote controller, and a microprocessor. The microprocessor generates a label image based on the television program selected by the user with the remote controller, the program information corresponding to the television program, and the data which the user has input in the video recorder. And then the microprocessor sends the generated label image to the external device such as the printer.

2 Claims, 7 Drawing Sheets

VIDEO RECORDER AND PRINTING SYSTEM INCLUDING VIDEO RECORDER

BACKGROUND OF THE INVENTION

1. Field of the Invention

The present invention relates to a video recorder, and a printing system including a video recorder.

2. Description of the Related Art

In recent years, a television program recorded by a video recorder such as a hard disk drive recorder is frequently dubbed to a disk such as a DVD-R (digital versatile disk recordable). When dubbing, a user sometimes makes a printer print on the disk cover label and the disk label (hereinafter collectively called "the label") the image including a television program title and the cast of the program. Thus, a user can recognize the television program recorded on the disk only by seeing the label.

In the field of the above kind of technology, Japanese laid-open patent publication 2003-134447 discloses a video recorder which automatically generates a image for the label (hereinafter, referred to as "label image") by using a template corresponding to the content of the television program, and sends the image to a printer.

However, the above described video recorder has the problem that cannot reflect in the label image the data which a user has input in the video recorder. Therefore, if a user wants to reflect in the label image the data which a user has input in the video recorder, a user has to not only make the video recorder send the label image generated in the video recorder to a PC (personal computer), but also enter the same data as those input in the video recorder so that the PC can reflect the data in the label image. This method takes a lot of trouble in editing the label image.

Meanwhile, in order to save the effort in editing and generating the label image, many users want to generate the label image using the program information such as an EPG (Electronic Program Guide) corresponding to the television program recorded in the video recorder.

However, the video recorder disclosed in the Japanese laid-open patent publication 2003-134447 cannot reflect the program information in the label image.

SUMMARY OF THE INVENTION

An object of the present invention is to provide a video recorder and a printing system including the video recorder that can generate a label image using program information received by a tuner and data which a user has input in the video recorder, thereby making it possible to save the user's effort in editing and generating the label image.

According to a first aspect of the present invention, this object is achieved by a video recorder connected to an external device including a printer.

The video recorder comprises: a tuner for receiving a television program and program information corresponding to the television program; a recording medium for recording the television program and the program information received by the tuner; operation means for operating the video recorder; control means for controlling each component in the video recorder; image generating means for generating the label image based on the television program selected by the user with the operation means, and the program information corresponding to the television program; and image sending means for sending the label image generated by the image generating means to the external device.

With the above configuration, the video recorder can generate the label image using the television program and the program information received by the tuner. Thus, the user needs not input with the operation means any data included in the program information received by the tuner. Accordingly the video recorder can make it possible to save the user's effort in editing and generating the label image.

Preferably, the image generating means generates the label image based on the television program, the program information corresponding to the television program, and the data which the user has input in the video recorder.

According to a second aspect of the present invention, the object is achieved by a printing system comprising a personal computer, a printer, and a video recorder.

The video recorder is connected to the personal computer.

The personal computer is connected to the printer.

The video recorder comprises: a tuner for receiving a television program and program information corresponding to the television program; a recording medium for recording the television program and the program information received by the tuner; operation means for operating the video recorder; control means for controlling each component in the video recorder; image generating means for generating the label image based on the television program selected by the user with the operation means, and the program information corresponding to the television program; XML (Extensible Markup Language) document generating means for generating the XML document corresponding to the label image generated by the image generating means; and XML document sending means for sending the XML document generated by the XML document generating means to the PC.

The personal computer comprises: XML document receiving means for receiving the XML document from the video recorder; restoring means for restoring the XML document received by the XML document receiving means to its original label image; PC image editing means which is used by the user to edit the label image restored by the restoring means; and PC image sending means for sending the label image edited by the PC image editing means.

Preferably, the image generating means generates the label image based on the television program, the program information corresponding to the television program, and the data which the user has input in the video recorder.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Referring now to the accompanying drawings, the preferred embodiment of the present invention is described. The present invention relates to a video recorder, and a printing system including a video recorder. It is to be understood that the embodiments described herein are not intended as limiting, or encompassing the entire scope of, the present invention. Note that like parts are designated by like reference numerals, characters or symbols throughout the drawings.

Figure 1:
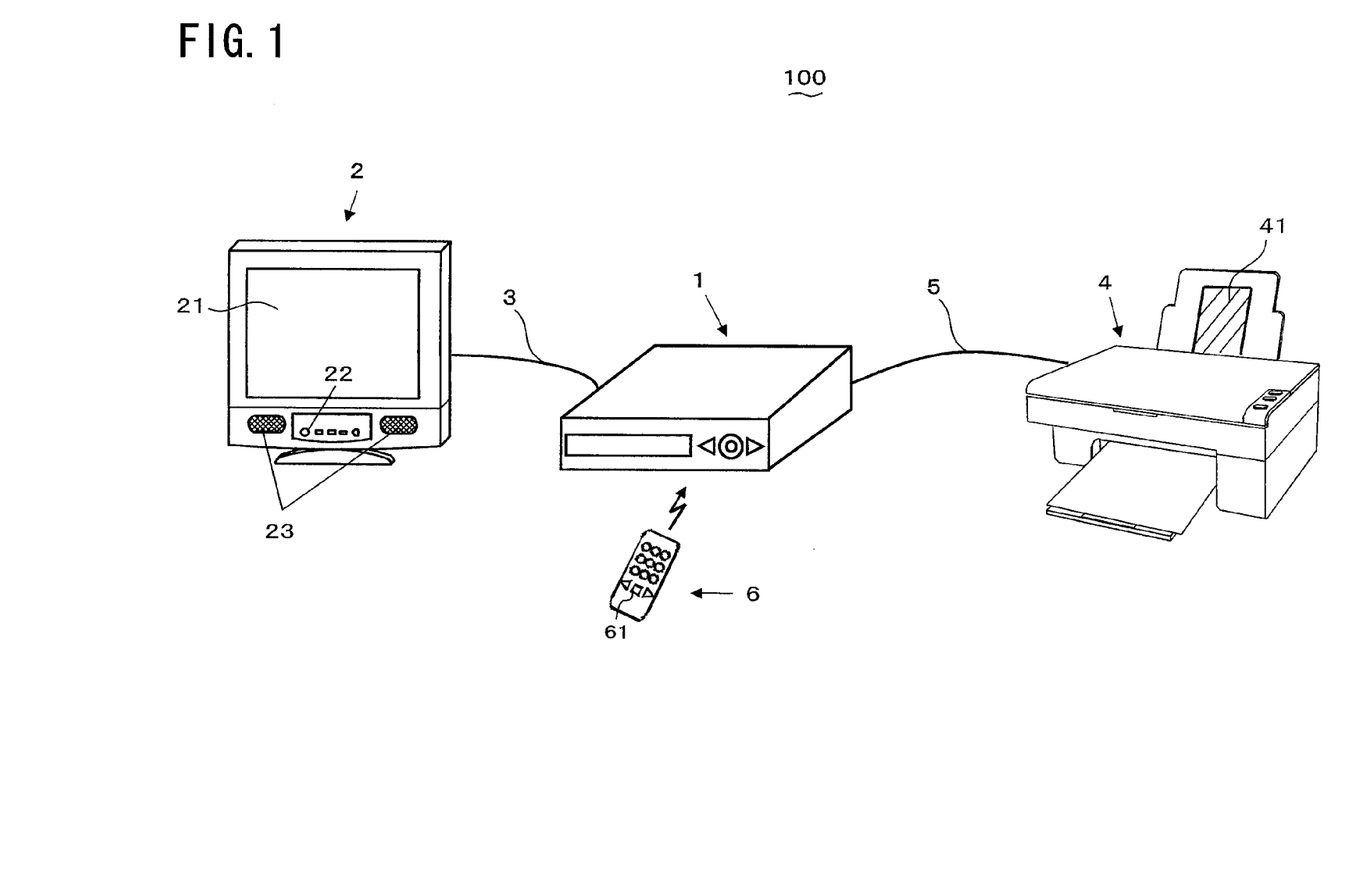
FIG. 1 is a perspective view of a printing system including a video recorder according to a first embodiment of the present invention.
Figure 2:
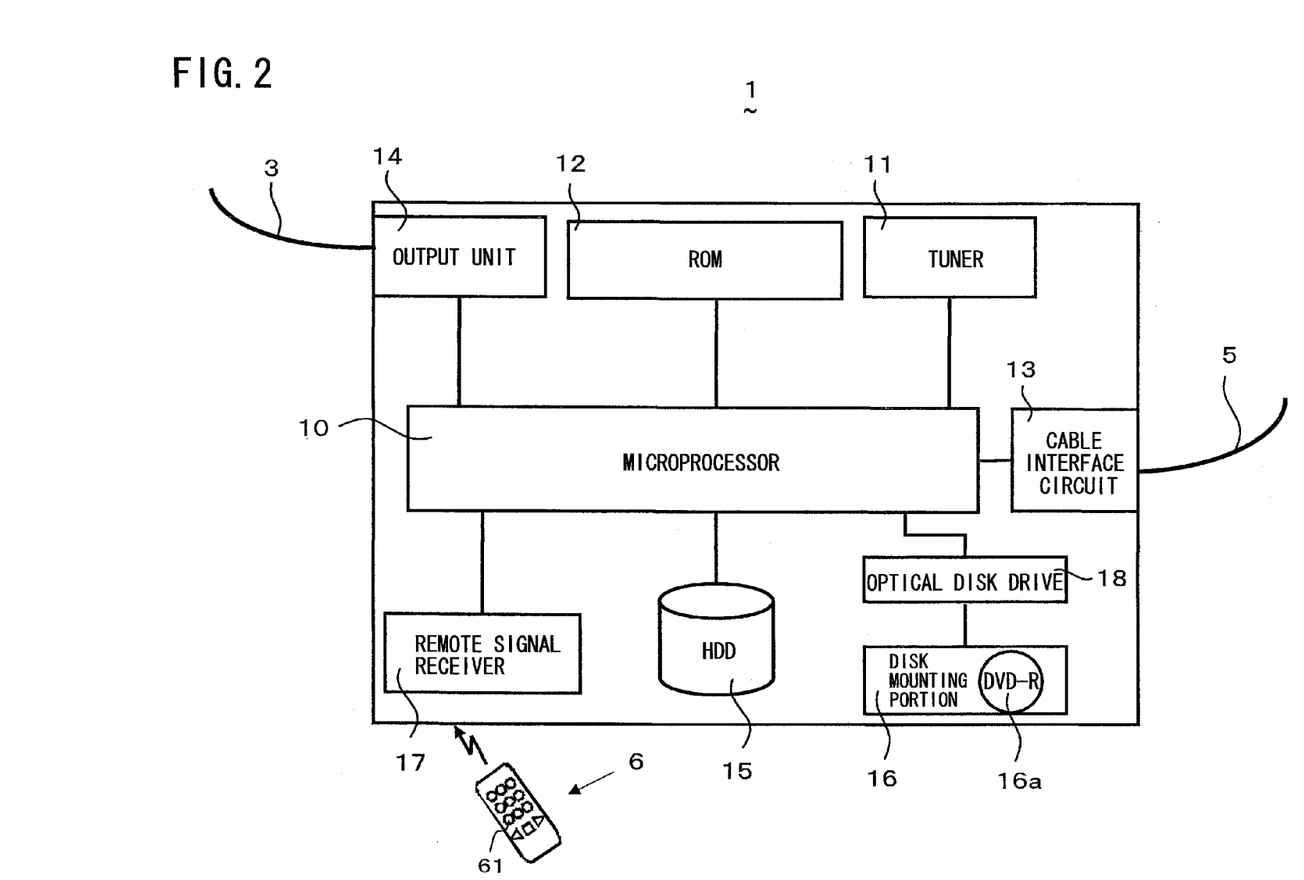
FIG. 2 is an electrical block diagram of the video recorder.

Referring to FIG. 1 and FIG. 2, a printing system including a video recorder according to a first embodiment of the present invention will be described. The first embodiment corresponds to claim 1 and 2. FIG. 1 shows an appearance diagram of the printing system 100 including the video recorder 1 which can record a television program, a television receiver 2 connected to the video recorder 1 through an AV cable 3 composed of a video cable and an audio cable, and a printer 4 connected to the video recorder 1 through a transmission cable 5. FIG. 2 shows an electrical block diagram of the video recorder 1.

The video recorder 1 is a so-called hard disk drive recorder. The video recorder 1 can not only store a television program on its hard disk drive (HDD) 15 (claimed recording medium), but also copy the television program stored on the HDD 15 to a disk such as a DVD-R (digital versatile disk recordable).

The television receiver 2 comprises a display 21 for displaying an image and a message, a loudspeaker 23 for outputting a sound, and plural operation keys 22 for performing various operations. The television receiver 2 outputs the image and the sound received from the video recorder 1 through the AV cable 3 to the display 21 and the loudspeaker 23, respectively.

The printer 4 prints the images received from the video recorder 1 through the transmission cable 5 on the CD/DVD case label 41.

As shown in FIG. 2, the video recorder 1 comprises a tuner 11 for receiving the television program and the program information such as an EPG (Electronic Program Guide) corresponding to the television program, HDD 15 for storing various data including the television program and the program information, a disk mounting portion 16 for mounting a DVD-R 16a, an optical disk drive 18 for reading from and writing on the DVD-R 16a mounted on the disk mounting portion 16, and microprocessor 10 for controlling each component in the video recorder 1.

The video recorder 1 further comprises a ROM (read-only memory) 12 for storing control programs describing a procedure of the microprocessor 10, a remote control signal receiving unit (remote signal receiver) 17 for receiving a remote control signal sent from a remote controller 6 so as to output to the microprocessor 10 the signal corresponding to the received remote control signal, an output unit 14 for outputting a video signal and an audio signal to the AV cable 3, and a cable interface circuit 13 for transmitting data including an image and a command for performing printing to the transmission cable 5. The video recorder 1 can record on the HDD 15 and/or the DVD-R 16a the television program, the program information, and the data which a user has input in the video recorder 1.

The remote controller 6 (claimed operation means) has operation keys 61 for operating the video recorder 1. These operation keys 61 are used for inputting the data about the television program (e.g., the television program title and the cast of the program) into the video recorder 1 so as to record the data on the HDD 15. The disk to be mounted on the disk mounting portion 16 is not limited to the DVD-R 16a. For example, a Blu-ray Disk, a High Definition DVD (HD DVD), and a digital versatile disk rewritable (DVD-RW) may be mounted on the disk mounting portion 16.

The microprocessor 10 serves as claimed control means, image editing means, and image generating means. The microprocessor 10 and the cable interface circuit 13 serve as claimed image sending means.

Figure 3:
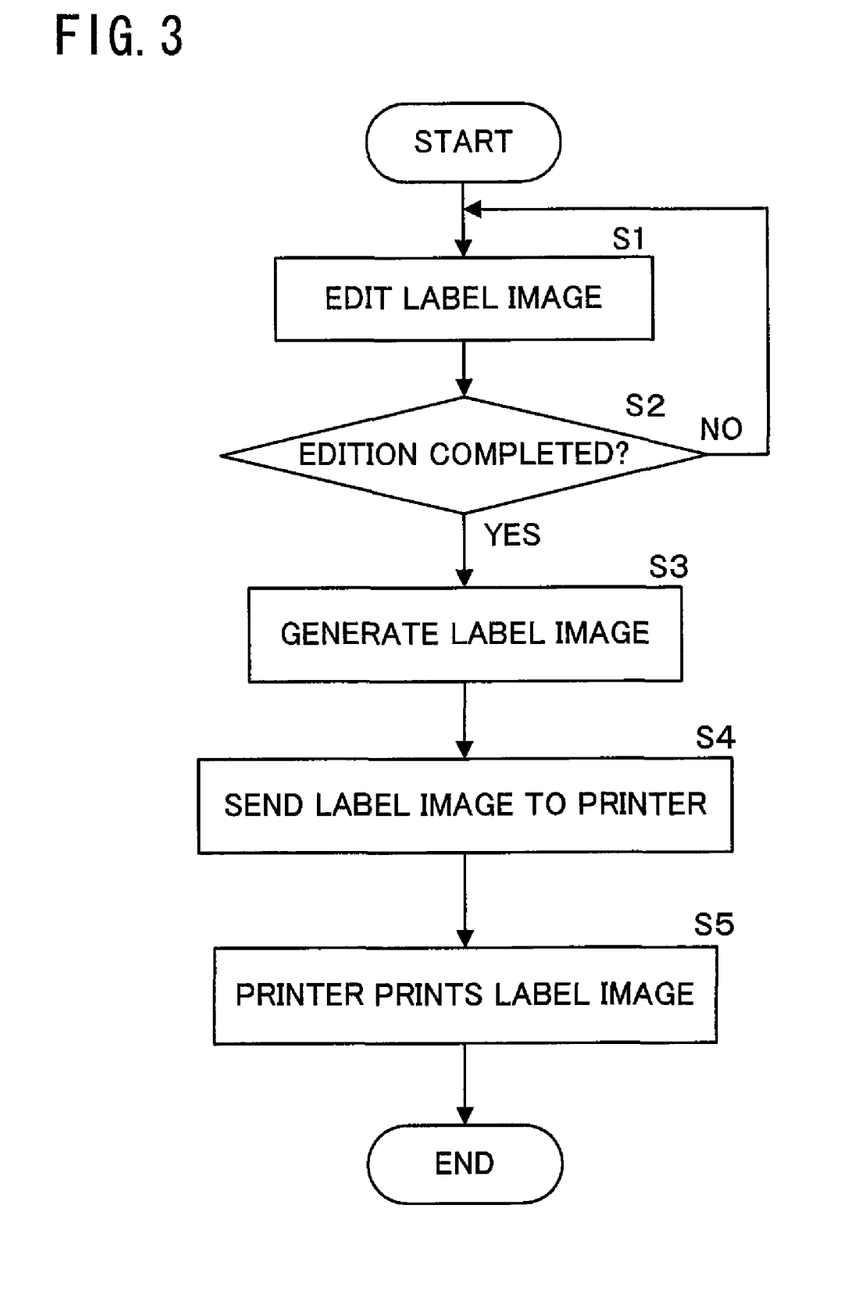
FIG. 3 is a flow chart showing a process of printing label image on a CD/DVD case label in the printing system.

Referring to FIG. 3, a process of printing the label image on the CD/DVD case label 41 in the printing system 100 will be described. When a user operates the remote controller 6 to select out of the television programs recorded on the HDD 15 a television program whose label image the user wants to generate, the microprocessor 10 edits the label image based on the selected television program, the program information, and the data which a user has input in the video recorder 1 (S1). Correctly speaking, the microprocessor 10 extracts words from both the program information and the input data recorded on the HDD 15, and then decides the arrangement position of these words and a typical scene from the selected television program in the label image. The program information is that included in an Electronic Program Guide (EPG). The program information includes the program title, the cast of the program, a brief description of the program's contents, and a category. The input data are those that a user can voluntarily input in the video recorder 1. For example, the input data may be a recommendation level or the user's feeling about the television program. Both the program information and the input data are character data.

After editing the label image (YES in S2), the microprocessor 10 generates the label image based on the extracted words and the decided arrangement position in the step S1 (S3). The microprocessor 10 of the video recorder 1 sends the generated label image to the printer 4 through the transmission cable 5 (S4). When receiving the label image from the video recorder 1, the printer 4 prints the label image received from the video recorder 1 on the CD/DVD case label 41 (S5). The label image generated in the step S3 is formatted in BMP, JPER, PNG, GIF or TIFF.

As described above, the video recorder 1 and the printing system 100 according to the first embodiment can generate the label image using the program information and the data which a user has input in the video recorder 1, without sending the label image to a PC (personal computer) and entering in the PC the same data as those input in the video recorder.

Further, the video recorder 1 can generate the label image using the television program and the program information received by the tuner 11. Thus, the user needs not input with the remote controller 6 any data included in the program information received by the tuner 11.

Accordingly, the video recorder 1 can make it possible to save the user's effort in editing and generating the label image.

Figure 4:
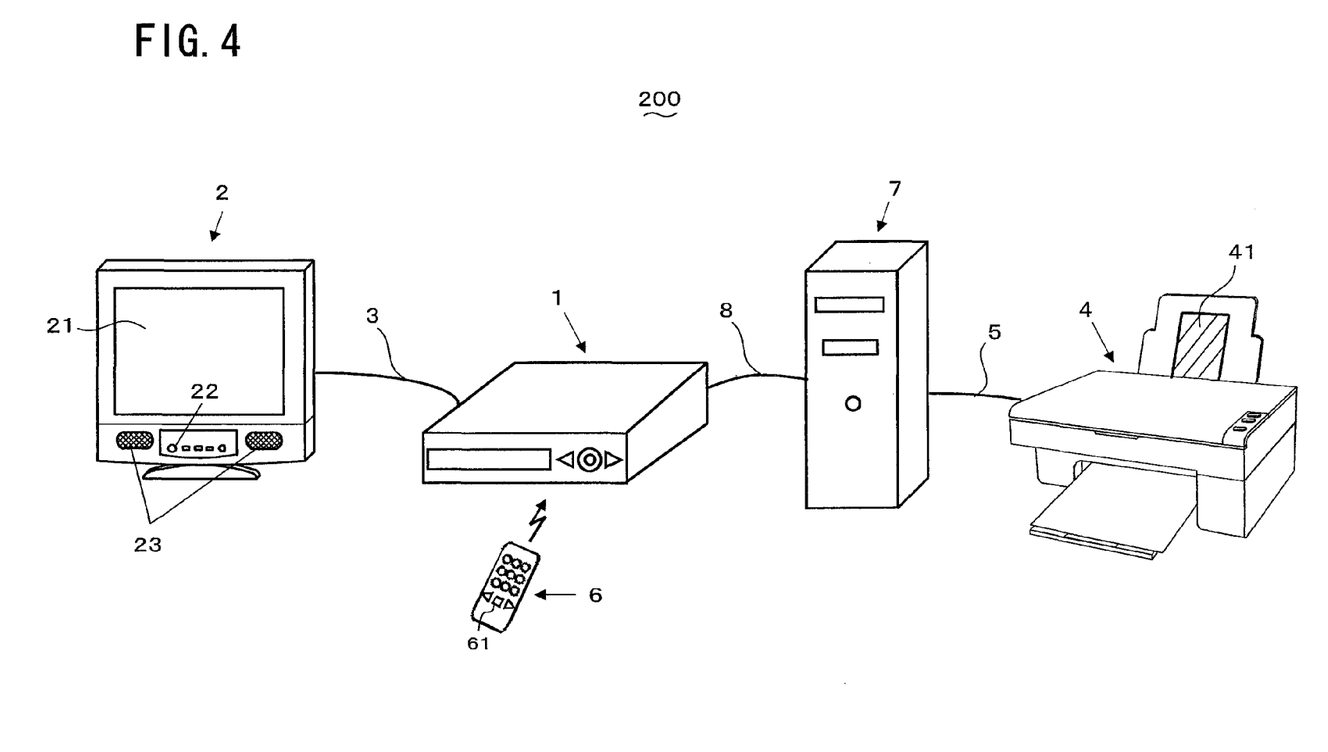
FIG. 4 is a perspective view of a printing system including a video recorder according to a second embodiment of the present invention.

Next, referring to FIG. 4 to FIG. 7, a printing system 200 including a video recorder 1 according to a second embodiment of the present invention will be described. The second embodiment corresponds to claim 3 and 4. FIG. 4 shows an appearance diagram of the printing system 200 according to the second embodiment. In FIG. 4, like parts as in FIG. 1 are designated by like reference numerals. As shown in FIG. 4, a video recorder 1 is connected to a printer 4 through a PC (personal computer) 7. The video recorder 1 and the PC 7 are connected to each other through a network cable 8. The PC 7 and the printer 4 are connected to each other through a transmission cable 5. Except these points, the printing system 200 according to the second embodiment has a configuration similar to that of the printing system 100 according to the first embodiment.

Figure 5:
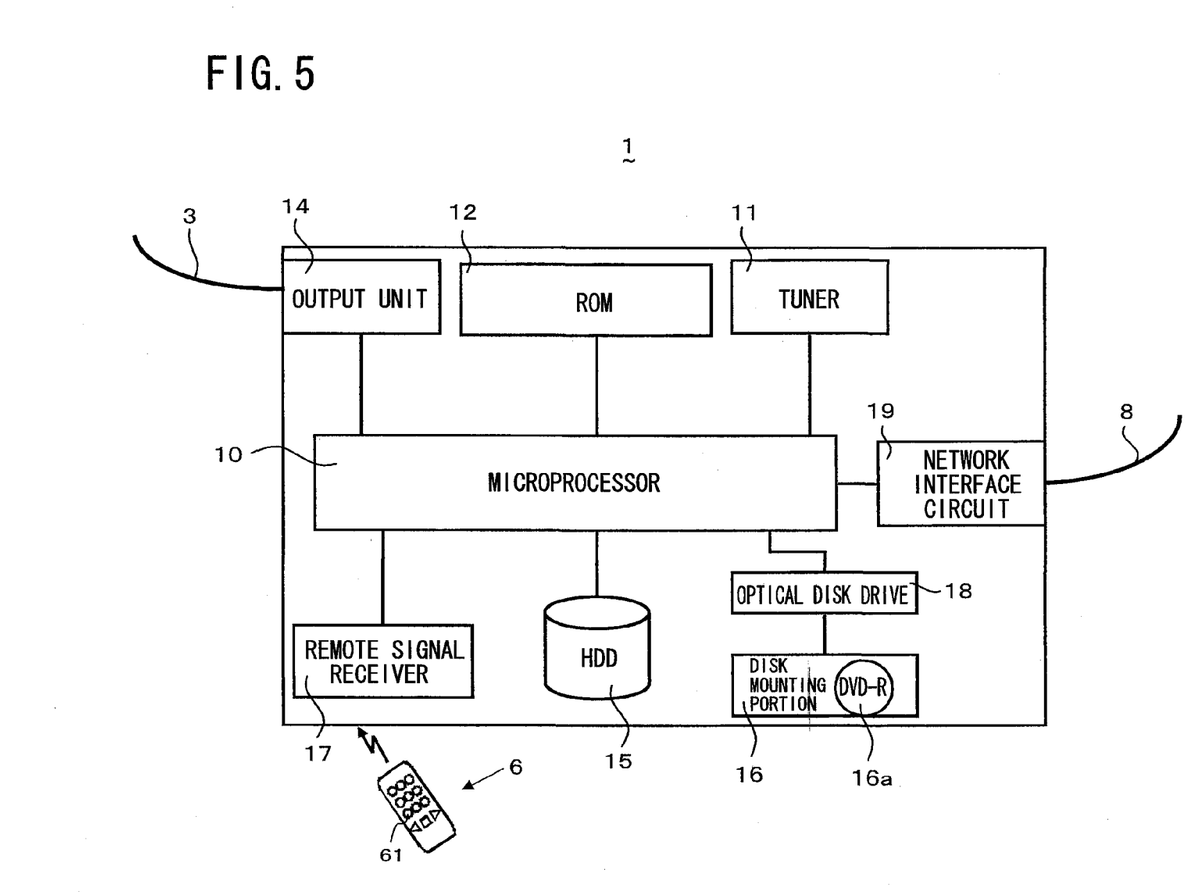
FIG. 5 is an electrical block diagram of the video recorder.
Figure 6:
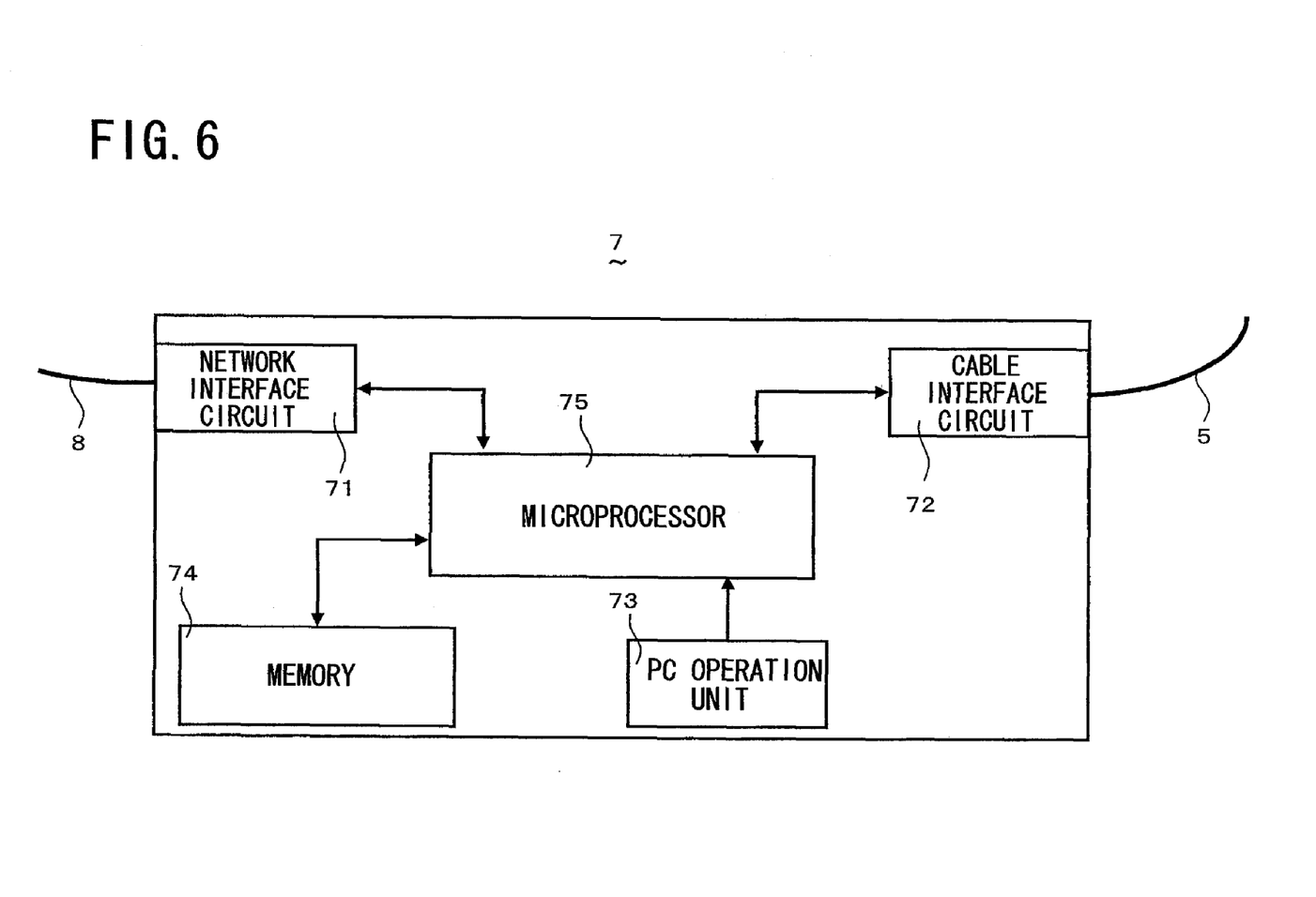
FIG. 6 is an electrical block diagram of a PC included in the printing system.

FIG. 5 shows an electrical block diagram of the video recorder 1. FIG. 6 shows an electrical block diagram of the PC 7. The video recorder 1 shown in FIG. 5 has a configuration similar to that of the video recorder shown in FIG. 2, except that the video recorder 1 shown in FIG. 5 has a network interface circuit 19 instead of the cable interface circuit 13 shown in FIG. 2. One end of the network cable 8 is connected to the network interface circuit 19, and the other end of the network cable 8 is connected to the PC 7. The microprocessor 10 serves as claimed control means, image generating means, and XML (Extensible Markup Language) document generating means. The microprocessor 10 and the network interface circuit 19 serve as claimed XML document sending means. The microprocessor 10 can convert the label image to the XML document.

As shown in FIG. 6, the PC 7 comprises a network interface circuit 71 to which the network cable 8 is connected, a cable interface circuit 72 to which the transmission cable 5 is connected, a PC operation unit 73 for performing various operations in the PC 7, a microprocessor 75 for controlling each component in the PC 7, and a memory 74 for storing various programs including control programs for the microprocessor 75 and a label image editing program to be used to edit the label image. The label image editing program has not only a function to restore an XML document to its original label image, but also a function to assist a user in editing the restored label image.

The microprocessor 75 serves as claimed restoring means. The microprocessor 75 and the network interface circuit 71 serve as claimed XML document receiving means. The microprocessor 75 and the cable interface circuit 72 serve as claimed PC image sending means. The microprocessor 75 and the PC operation unit 73 serve as claimed PC image editing means.

Figure 7:
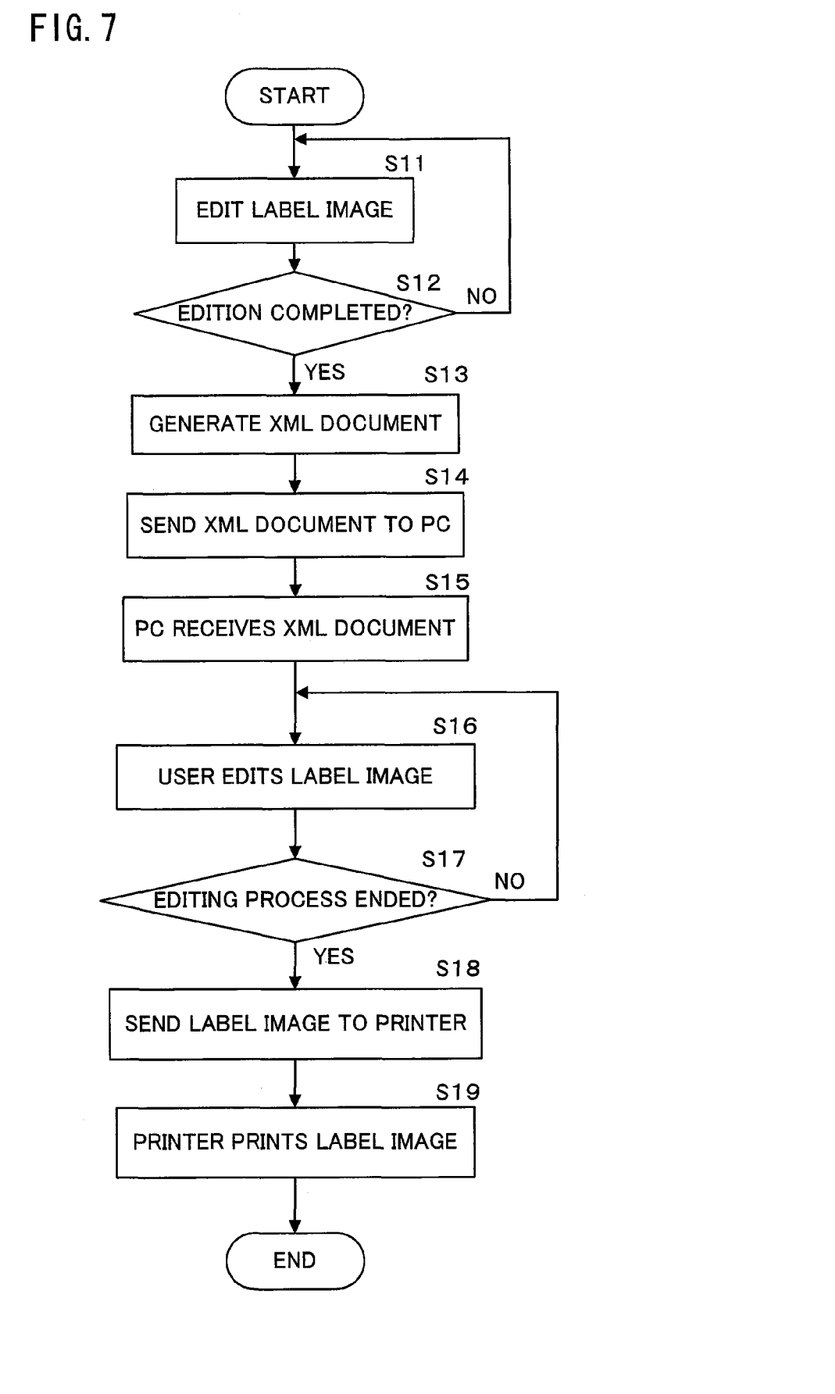
FIG. 7 is a flow chart showing a process of printing label image on a CD/DVD case label in the printing system.

Referring to FIG. 7, a process of printing the label image on the CD/DVD case label 41 in the printing system 200 will be described. Same as in the step S1 shown in FIG. 3, when a user operates the remote controller 6 to select out of the television programs recorded on the HDD 15 a television program whose label image the user wants to generate, the microprocessor 10 edits the label image based on the selected television program, the program information, and the data which the user has input in the video recorder 1 (S11).

After editing the label image (YES in S12), the microprocessor 10 generates the label image based on the extracted words and the decided arrangement position in the step S11, same as in the step S3 shown in FIG. 3. And then, the microprocessor 10 generates the XML document corresponding to the generated label image (S13). In other words, the microprocessor 10 converts the label image to the XML document. The microprocessor 10 of the video recorder 1 sends the generated XML document to the PC 7 (S14). Note that the microprocessor 10 may generate the XML document directly based on the extracted words and the decided arrangement position in the step S11 without generating the label image. The XML document includes not only the link information to the typical scene image from the selected television program but also the words extracted from both the program information and the input data in the step S11.

The microprocessor 75 of the PC 7 receives the XML document from the video recorder 1 (S15), and then restores the XML document to its original label image formatted in BMP, JPEG; PNG, GIF or TIFF. A user edits the restored label image by using the PC operation unit 73 in order to make the label image more desirable (S16).

When a user operates the PC operation unit 73 to inform the microprocessor 75 of the end of the editing process in the step S16 (YES in S17), the microprocessor 75 sends the edited label image to the printer 4 through the transmission cable 5 (S18). When receiving the edited label image from the PC 7, the printer 4 prints the label images received from the video recorder 1 on the CD/DVD case label 41 (S19).

Note that the microprocessor 10 of the video recorder 1 may generate character data corresponding to the label image, instead of generating the XML document corresponding to the label image. Further, the video recorder 1 may generate data corresponding to the label image in other file formats which not only the video recorder 1 but also the PC 7 can interpret, and then send the generated data to the PC 7. Furthermore, although the above embodiment describes an example in which the PC 7 sends the label image to the printer 4, in the case where both the PC 7 and the printer 4 are Universal Plug and Play (UPnP) compatible, the PC 7 may send the XML document corresponding to the label image to the printer 4 so that the printer 4 can print the label image based on the XML document. Furthermore, when both the video recorder 1 and the printer 4 are UPnP-compatible, the video recorder 1 may send the XML document corresponding to the label image to the printer 4.

As described above, according to the video recorder 1 and the printing system 200 of the second embodiment, the video recorder 1 can edit and generate the label image based on the television program selected by the user, the program information corresponding to the television program, and the data which the user has input in the video recorder 1. And then, the video recorder 1 generates the XML document corresponding to the generated label image to sends the generated XML document to the PC 7. The PC 7 restores the XML document received from the video recorder 1 to its original label image, and then sends the label image edited by the user with the PC operation unit 73 to the printer 4. Thus, the video recorder 1 can generate the label image using the program information and the data which the user has input in the video recorder 1, without sending the label image to a PC and entering in the PC the same data as those input in the video recorder. Accordingly, the video recorder 1 makes it possible to save the user's effort in editing and generating the label image.

It is to be noted that the present invention is not limited to the above embodiments, and various modifications are possible within the spirit and scope of the present invention. For example, in the embodiments described above, the microprocessor 10 edits and generates the label image based on the television program and the program information recorded on the HDD 15. However, the microprocessor 10 can edit and generate the label image based on the television program and the program information received by the tuner 11 without recording the television program and the program information on the HDD 15. Furthermore, a claimed recording medium for recording the television program and the program information is not limited to the HDD 15. A recording medium such as a universal serial bus (USB) flash memory, a secure digital (SD) card, or the like can be used as the claimed recording medium. In this case, the video recorder 1 generates an image of a label to be put in a USB memory case or an SD card case, and then the printer 4 prints the label image received from the video recorder 1.

Furthermore, the label image to be generated is not limited to the label image for the disk cover label such as the CD/DVD case label. The label image can be that for a disk label such as a CD/DVD label.

This application is based on Japanese patent application 2006-262482 filed Sep. 27, 2006, the contents of which are hereby incorporated by reference.

What is claimed is:

1. A printing system comprising a personal computer, a printer, and a video recorder,
- wherein the video recorder is connected to the personal computer,
- wherein the personal computer is connected to the printer,
- wherein the video recorder comprises:
  - a tuner for receiving a television program and program information corresponding to the television program;
  - a recording medium for recording the television program and the program information received by the tuner;
  - operation means for operating the video recorder;
  - control means for controlling each component in the video recorder;
  - image generating means for generating the label image based on the television program selected by the user with the operation means, and the program information corresponding to the television program;
  - XML (Extensible Markup Language) document generating means for generating the XML document corresponding to the label image generated by the image generating means; and
  - XML document sending means for sending the XML document generated by the XML document generating means to the PC,
- wherein the personal computer comprises:
- XML document receiving means for receiving the XML document from the video recorder;
- restoring means for restoring the XML document received by the XML document receiving means to its original label image;
- PC image editing means which is used by the user to edit the label image restored by the restoring means; and
- PC image sending means for sending the label image edited by the PC image editing means.

2. The printing system according to claim 1,
- wherein the image generating means generates the label image based on the television program, the program information corresponding to the television program, and the data which the user has input in the video recorder.

* * * * *